May 16, 1944.  J. FERRANTE  2,349,153
METHOD OF PRODUCING FLOCKED SHEET MATERIAL
Filed Nov. 23, 1940     2 Sheets-Sheet 1
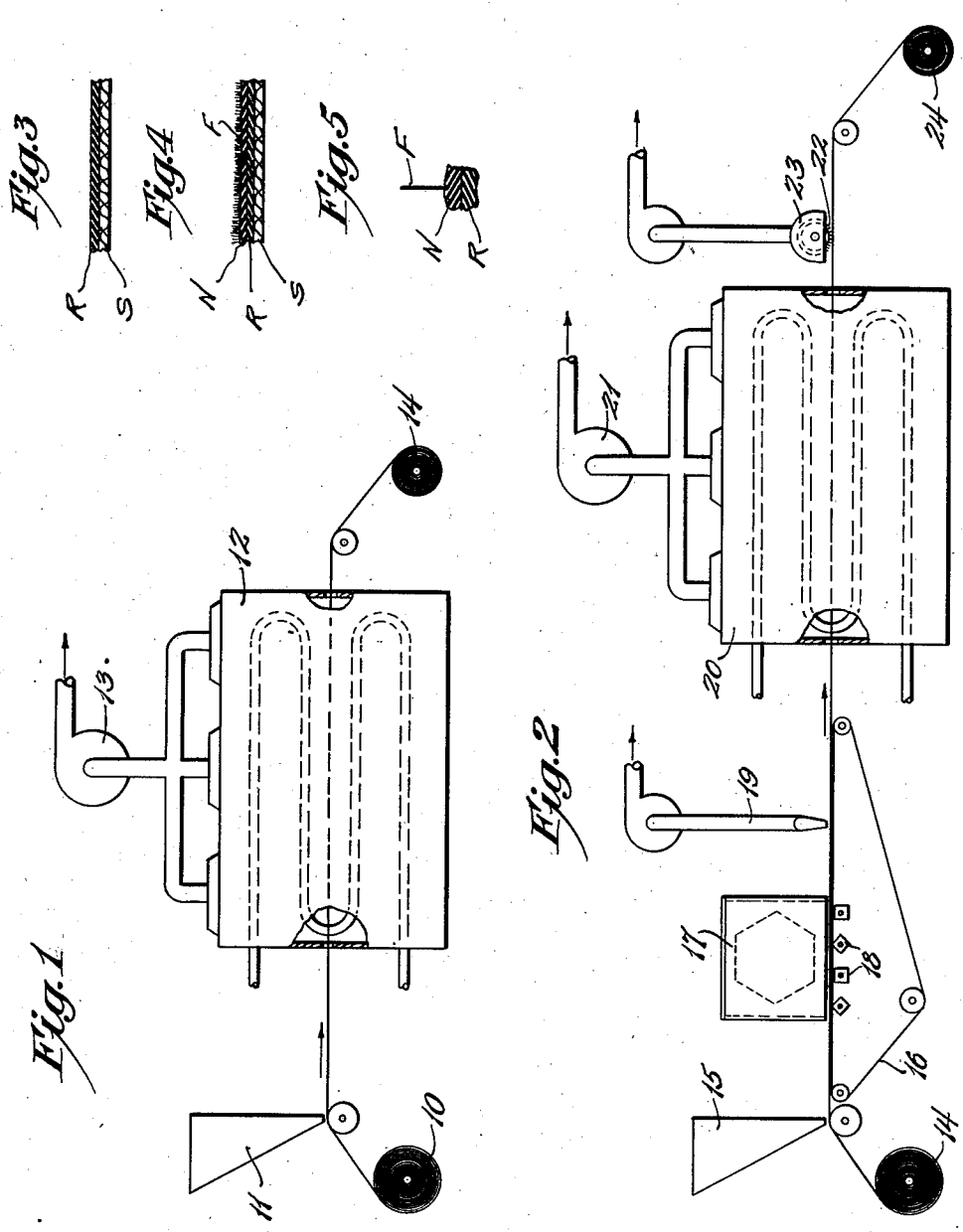
Inventor
John Ferrante May 16, 1944.  J. FERRANTE  2,349,153
METHOD OF PRODUCING FLOCKED SHEET MATERIAL
Filed Nov. 23, 1940    2 Sheets-Sheet 2
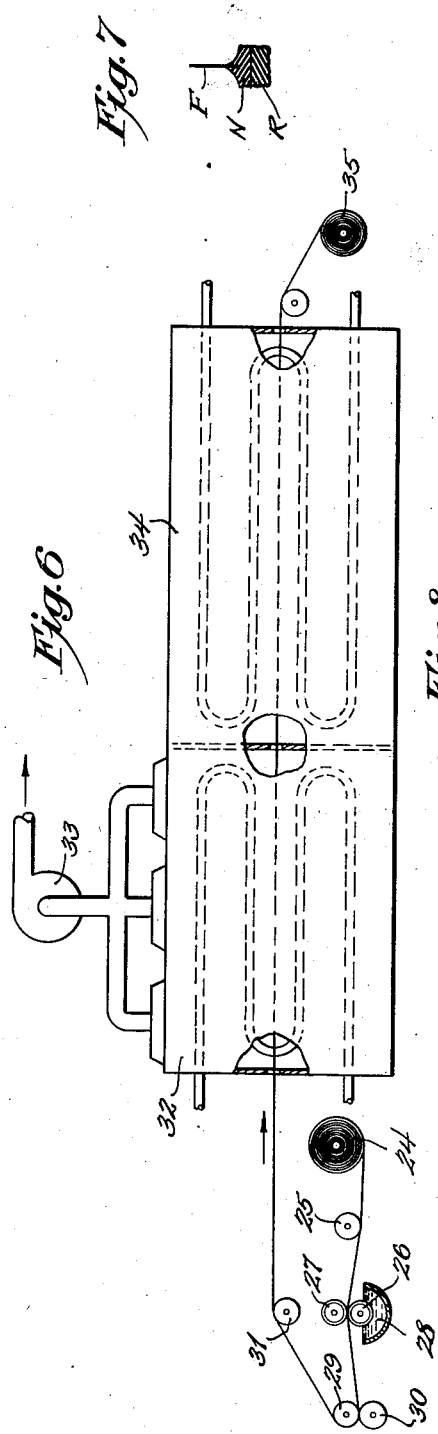
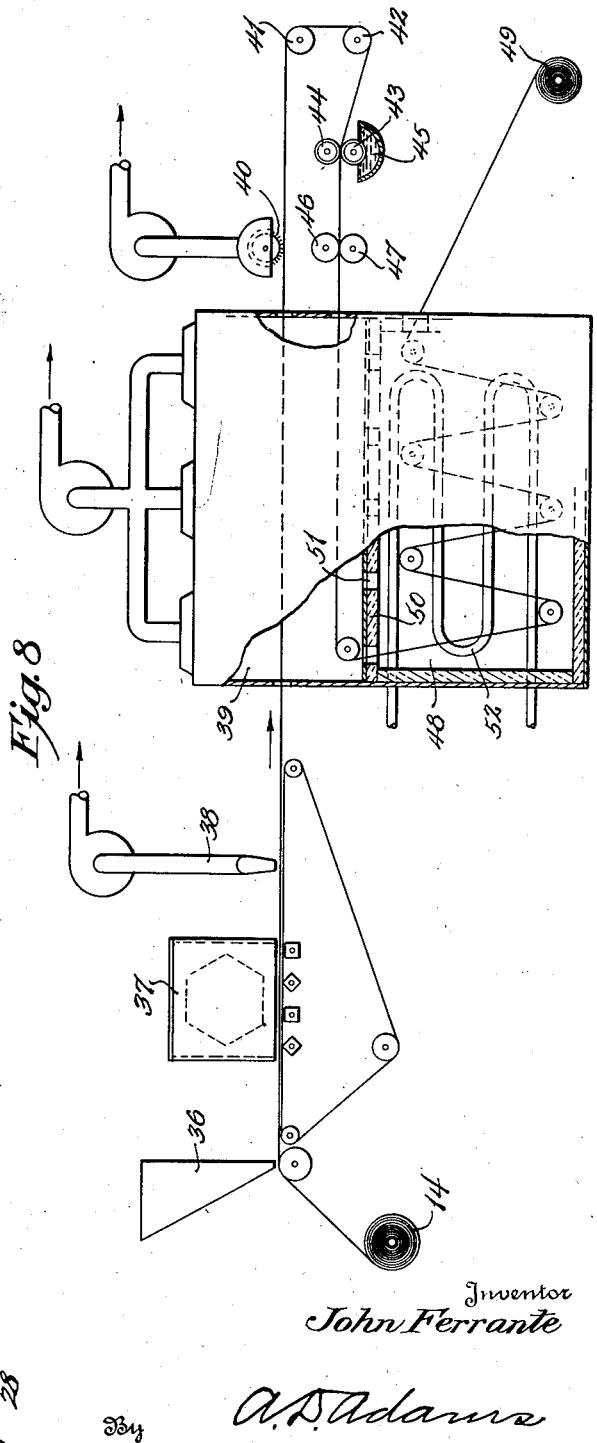
Inventor
John Ferrante Patented May 16, 1944

2,349,153

UNITED STATES PATENT OFFICE 2,349,153

METHOD OF PRODUCING FLOCKED SHEET MATERIAL

John Ferrante, Johnstown, N. Y., assignor to Kenlea Mfg. Corporation, a corporation of New York Application November 23, 1940, Serial No. 366,908

7 Claims. (Cl. 117—29)

This invention relates to flocked sheet material and, among other objects, aims to provide an improved method of producing a suede like finish on sheet material, such as paper, knitted and textile fabrics, rubber and the like. The main idea is to produce finished flocked sheets on which the flock is firmly attached, so that it cannot easily be removed or rubbed off, even under abnormal conditions. Another aim is to provide a novel method of making a laminated flocked sheet in which a base coating of ordinary plastic Hevea rubber and a thin flock anchorage coating of vulcanizable synthetic rubber are applied so that the anchorage coating not only serves more firmly to imbed the flock, but also acts as a protective layer to prevent deterioration of the base coat due to aging, exposure to sunlight, weathering and the solvent action of ordinary cleaning fluids, oils and greases.

This application is a continuation-in-part of my copending application Ser. No. 179,030 filed December 9, 1937.

In the drawings:

Fig. 1 is a diagrammatic view of one form of apparatus for applying and drying a base coat of Hevea rubber to a continuous sheet of fabric;

Fig. 2 is a similar view showing apparatus for applying a coating of synthetic rubber and then a layer of flock to the coated product of Fig. 1 and subsequently drying it;

Fig. 3 is an enlarged, fragmentary, sectional view of the product of Fig. 1;

Fig. 4 is an enlarged, fragmentary, sectional view of the product of Fig. 2;

Fig. 5 is a greatly enlarged, fragmentary, sectional view of the material shown in Fig. 4;

Fig. 6 is a view similar to Fig. 1 showing apparatus for applying solvent to the product of Fig. 2 and then drying and vulcanizing it to form the completed material;

Fig. 7 is a greatly enlarged, fragmentary, sectional view of the product of Fig. 6 showing how a flock fiber is firmly imbedded in the synthetic rubber; and Fig. 8 is a diagrammatic view of a form of apparatus for producing completed flocked material in a continuous operation.

In the practice of manufacturing flocked sheet material, one of the methods employed has been to apply an adhesive coating, usually vulcanizable rubber cement, to a continuous strip of material, dusting or shaking flock on the coating, agitating the material and subsequently curing or vulcanizing the cement binder. Several variations of this method have been used, such as removing the excess flock by suction or the like, before vulcanization and brushing the finished surface after it is dried or is vulcanized.

It has been found that, even after vulcanization, the flock is not firmly imbedded in the cement and may be readily scraped off, particularly if a rubber cement solvent is employed. While it is not generally intended that such drastic steps be taken to destroy the finish, it frequently happens that the flocked surface is marred by such means. For example, it has recently been the practice to make such articles as shoe uppers, ladies' handbags, gloves and the like from flocked sheet material, and such articles are subjected to much abuse, with the result that the suede like finish is ruined, particularly so should gasoline or other solvents come in contact with the surface. The present method produces a suede like finish which will withstand abnormal abuse and which may be cleaned frequently with ordinary solvents without sloughing off.

Referring particularly to the drawings, Fig. 1 illustrates one form of apparatus for applying and drying a base coating of ordinary plastic, Hevea rubber to sheet material to which is subsequently applied an adhesive and protective coating of vulcanizable synthetic rubber cement in which the flock fibers are to be imbedded. The material to be treated, such as paper, rubber, fabric or the like, is preferably in the form of a roll 10 from which it is unwound and passed beneath a coating applying apparatus 11, such as is shown in the patent to Lea No. 2,073,557. The coating in this instance, is composed of ordinary rubber cement to which is added rubber solvent. It is spread in a uniform layer on the top surface of the material to which it adheres. In the case of a knitted or woven fabric base, the cement firmly imbeds itself in the interstices thereof adhering firmly thereto and presenting an even upper surface. The coated material then passes through an ordinary drier chamber from which solvent vapor is removed by a suction fan 13 and subsequently recovered. The material, after passing through the chamber 12, is wound in the form of a roll 14 so that it can be stored or transferred to apparatus for performing the next step in the method.

Referring to Fig. 2, the roll 14 of Fig. 1 is unwound and fed through a second apparatus for coating and flocking it. In this instance, the material passes beneath a coating apparatus 15, similar to the apparatus 11. This coating consists of a very thin layer of synthetic rubber, such as is sold under the trade name of "neoprene," to which its solvent and a plasticizer have been added. "Neoprene" is used because of its resistance to oils, oxidation, heat, ozone, etc. in sharp contrast to natural rubber which is detrimentally affected by such exposures. The solvent employed with "neoprene" is different from that used in the base coating of rubber. In this instance, it comprises coal tar naphtha and a chlorinated hydrocarbon such as carbon tetrachloride. The plasticizer, in this instance, may be sulphonated hydrocarbon or oil made for the purpose. Preferably about ½ to 1% by volume of this plasticizer is added to the solvent. The "neoprene" coating is spread in a uniform layer up to about .01 inch thick on the top surface of the rubber coated material.

The material, thus coated, then passes over an endless web 16 and beneath a flock applying device 17, where flock, such as comminuted cotton, wool, silk or the like, is sifted or otherwise distributed on the surface of the plastic "neoprene" binder. In order that the flock may be distributed more evenly, the web is agitated by rotating beaters 18 which agitation is transferred to the sheet material and the applied flock. After leaving the flock applying apparatus, the surplus flock which has not adhered to the binder is removed by means of a suction nozzle 19 and reclaimed for further use. The treated material is then dried, conveniently by passing it through a heated drying chamber 20, from which the solvent vapor may be carried off by a suction fan 21. After leaving the drying chamber, the finished side of the material may be brushed by means of a rotary brush 22 mounted within a suction hood 23 to remove any flock not removed by the nozzle 19 and to give the material a softer or smoother finish. After this step, the material is shown as being wound into a roll 24 ready for storage and subsequent treatment.

Figs. 3 and 4 represent the product of Figs. 1 and 2 respectively or of the successive steps in practicing that portion of the method thus far described. In Fig. 3, the sheet S is shown as having a base coating R of rubber and in Fig. 4 a top coating N of "neoprene" and the nap fibers F. In Fig. 5, a flock fiber is shown as being slightly imbedded in the "neoprene" binder. It has been found that by applying a solvent to the flocked material at this point the "neoprene" binder is softened and is raised upwardly around the roots of the fibers by capillary attraction, thereby increasing the depth to which the fibers are actually imbedded in the binder. Incidentally, by applying pressure to the flocked surface, the depth of penetration of the fibers into the binder is increased. The solvent may be clear but is preferably colored by an aniline or oil-soluble dye of the same color as that of the flock to improve the appearance of the surface and prevent any discoloration of the dyed fibers. This is particularly true when black flock is employed because a clean solvent will give the finished flock a gray appearance. It has been found, further, that if heat is applied immediately after the application of solvent, the solvent is evaporated more rapidly, thereby accelerating the capillary action of the dissolved binder around the roots of the fibers. The material is subsequently vulcanized to produce a finished product.

Referring again to the drawings, one form of apparatus for accomplishing the above steps is illustrated in Fig. 6 wherein the roll 24 is shown as having its ends reversed so that the material is fed therefrom with the flocked side on the bottom. The material passes beneath a guide roll 25 and between a lower solvent applying roll 26 and an upper pressure roll 27. Both rolls are preferably felt covered and the lower roll is partially immersed in a trough containing "neoprene" solvent 28 so that the solvent is picked up by the felt covering and applied to the flocked side of the sheet. The solvent is thus caused to wet or penetrate the fibers and dissolve or soften some of the "neoprene" binder around the roots of the fibers. As before stated, the solvent is preferably colored to match the color of the flock. The roll 27 exerts pressure on the upper or back side of the material, thereby squeezing out excess solvent and simultaneously forcing the fibers deeper into the softened, uncured "neoprene" binder.

It has been found that if pressure is subsequently applied, the flock will be imbedded still deeper into the binder, because the solvent will have additional time to be effective. To this end, the material, after it leaves the rolls 26 and 27 is guided between smooth pressure rolls 29 and 30. It then passes upwardly around the upper roll 29 and over a guide roll 31 into a drying chamber 32 wherein the temperature is preferably maintained at about 150° F. or more, to evaporate the remaining solvent on the material and thus hastening the capillary action. The vapor in the chamber 32 may be withdrawn by a suction fan 33. The dried material then passes through a vulcanizing chamber 34 where the temperature is preferably about 260° F. or more to vulcanize both the natural rubber base and the "neoprene" binder. The two rubbers are naturally compounded so that each cures properly at the same temperature and in the same interval of time. After vulcanization, the finished product is wound on a batching roll 35.

Fig. 7 illustrates the flock fiber of Fig. 5 imbedded firmly in an upstanding pimple-like mound of "neoprene."

It is to be understood that the application of either the rubber base or the "neoprene" may be applied and the sheet flocked, dried and finished by the application of solvent and subsequent drying and vulcanization in a continuous operation. In Fig. 8, there is shown suitable apparatus for performing these operations. Assuming that the roll of material 14 has previously been coated with Hevea rubber in accordance with the process described in connection with Fig. 1, it is coated with "neoprene" by apparatus 36; then flocked by the flocking apparatus 37 and the excess flock is sucked off through a suction nozzle 38. Thence, it passes through a drying chamber 39 and beneath a brush 40. The path of the sheet is then reversed by passing around guide rollers 41 and 42 and between a lower solvent applying roll 43 and an upper pressure roll 44, the lower roll being immersed in a trough containing "neoprene" solvent 45. Then it passes through the two smooth pressure rolls 46 and 47 better to compress the flock into the softened "neoprene." From these rolls the material is shown as passing back into the drying chamber 39 where the remaining solvent on the flock is evaporated, thus hastening the capillary action. After passing through the drying chamber, the material is fed downwardly into and through a vulcanizing chamber 48 where the "neoprene" binder and rubber base are cured and the finished product is then wound on a batching roll 49.

As shown in Fig. 8, the drying and vulcanizing chambers are preferably combined in a single unit; although it will be understood that they may be separated from each other as shown in Fig. 6. The vulcanizing chamber is in the lower portion of the unit and is separated from the drying chamber by a partition 50 which has a series of perforations 51 permitting some of the hot air to escape upwardly into the drying chamber. Thus, a single set of heating coils 52 in the vulcanizing chamber will serve the double purpose of vulcanization and drying.

Obviously, the temperatures in the vulcanizing and drying chambers may be and preferably are controlled automatically; but this forms no part of the present invention. They may be selected to suit the composition of the particular types of rubber employed. It is also to be understood that the "neoprene" solvent may be applied by any other well known method instead of using the ordinary submerged roll to transfer it from a trough. For example, it may be sprayed directly on the flocked surface of the sheet and the sheet subsequently subjected to pressure. It is important, however, that pressure be applied to the flocked surface as soon as the "neoprene" coating is softened by its solvent and it has been found that the flock fibers are more firmly imbedded in the "neoprene" if the flocked sheet is immediately subjected to drying heat. However, it is contemplated that, in some cases, the solvent may be applied to the material immediately after the flock is applied and the excess flock is removed, and while the "neoprene" is still in a dampened and somewhat softened condition. Whatever method is employed for applying the solvent, it is quite important that the flock fibers shall be partially imbedded in the uncured or tacky "neoprene."

The method described in connection with Fig. 8 may be employed to apply a very thin coat of "neoprene" without any rubber base on light-weight materials, such as gossamer fabrics, especially where thickness of the finished product is not essential. In that event, the "neoprene" is applied in the form of a heavy dough to prevent deep penetration into the interstices of the fabric. This also conserves the solvent which is mixed with the "neoprene." Even though the flock fibers do not penetrate the dough-like coating of "neoprene" as deeply as they would a more plastic coating, the subsequent solvent treatment insures adequate depth of penetration of the fibers to produce a good wearing surface and, at the same time, to impart a soft draping effect to the flocked surface.

Obviously, the method is not dependent upon the particular apparatus herein shown and described. Neither is the invention limited to a strict conformity to the described steps, but is capable of many variations without departing from the spirit thereof.

What is claimed is:

1. The process of flocking sheet material with fibers to produce a suede-like finish, which comprises applying ordinary rubber cement to the surface; then applying a thin coat of "neoprene"; applying flock to the "neoprene" surface; removing excess flock; subjecting the flocked material to drying heat; applying a solvent for the "neoprene" directly to the flocked surface; heating the material to evaporate the solvent and accelerate the capillary action of the dissolved "neoprene" on the roots of the flock fibers; and subsequently vulcanizing the rubber and the "neoprene" coating.

2. The process of flocking sheet material with fibers to produce a suede-like finish, which comprises applying a base coating of Hevea rubber cement to one face of the material; subjecting the base coating to drying heat; then applying a thin coating of plasticized "neoprene" cement to the base coating; applying flock to the "neoprene" coating; again subjecting the material to drying heat and removing excess flock; wetting the flocked surface with a "neoprene" solvent and subjecting the flock fibers to penetrating pressure; immediately subjecting the wetted surface to drying heat; and finally vulcanizing the said coatings.

3. The process of flocking sheet material with fibers to produce a suede-like finish, which comprises continuously feeding the material through a machine; applying ordinary rubber cement to the surface; then applying a thin coat of "neoprene"; applying flock to the "neoprene" surface; removing excess flock; drying the flocked material; applying a solvent for the "neoprene" directly to the flocked surface; heating the moving material as it is delivered from the machine to evaporate the solvent and accelerate the capillary action of the dissolved "neoprene" on the roots of the flock fibers; vulcanizing said coatings; and winding the finished material on a batching roll.

4. The process of flocking sheet material with fibers to produce a suede-like finish, which comprises continuously feeding the material through a machine; applying plasticized "neoprene" to the surface; applying flock to the "neoprene"; removing excess flock; drying the flocked material; applying a solvent for the "neoprene" directly to the flocked surface; heating the moving sheet of material to evaporate the solvent and accelerate the capillary action of the dissolved "neoprene" on the roots of the flock fibers; removing the solvent vapors from the material by suction during the successive drying operations; vulcanizing the "neoprene" coating; and winding the finished material on a batching roll.

5. That method of treating fiber flocked sheet material having a "neoprene" coating which is characterized by applying sufficient "neoprene" solvent to the flocked surface to penetrate the exposed fibers and dissolve some of the "neoprene" at the roots of the fibers to increase the depth of penetration of the fibers in the binder by capillary action; applying pressure to the material better to fix the fibers in the softened "neoprene" coating; and then subjecting the sheet to solvent vaporizing heat to remove the solvent and simultaneously accelerate the capillary action of the dissolved "neoprene" on the fiber roots, so that the material is ready to be vulcanized.

6. That method of treating fiber flocked sheet material having a dyed flock and "neoprene" coating which is characterized by applying directly to the flocked surface sufficient "neoprene" solvent having a fast dye of the same color as the flock mixed therewith to penetrate the exposed fibers and dissolve some of the "neoprene" at the roots of the fibers to increase the depth of penetration of the fibers in the coating by capillary action; and then subjecting the sheet to solvent vaporizing heat to remove the solvent and simultaneously accelerate the capillary action of the dissolved "neoprene" on the fiber roots, so that the material is ready to be vulcanized.

7. That method of treating fiber flocked sheet material having a "neoprene" binder which is characterized by applying sufficient "neoprene" solvent directly to the flocked surface to penetrate the exposed fibers and dissolve some of the "neoprene" at the roots of the fibers to increase the depth of penetration of the fibers in the binder by capillary action; immediately subjecting the sheet to solvent vaporizing heat to accelerate the capillary action; and finally vulcanizing the "neoprene" by passing it through a heated vulcanizing chamber in a continuous operation.

JOHN FERRANTE.